United States Patent
Ebersole et al.

(10) Patent No.: US 11,311,130 B1
(45) Date of Patent: Apr. 26, 2022

(54) SUPPORT ASSEMBLY FOR WIRE SHELF AND METHOD OF USE

(71) Applicant: The Invention Club, LLC, Mechanicsburg, PA (US)

(72) Inventors: Jonathan Scott Ebersole, Mechanicsburg, PA (US); Debra Michelle Lohman, Mechanicsburg, PA (US)

(73) Assignee: The Invention Club, LLC, Mechanicsburg, PA (US)

( * ) Notice: Subject to any disclaimer, the term of this patent is extended or adjusted under 35 U.S.C. 154(b) by 241 days.

(21) Appl. No.: 16/794,492

(22) Filed: Feb. 19, 2020

(51) Int. Cl.
| *A47G 25/06* | (2006.01) |
| *F16M 13/02* | (2006.01) |
| *F16B 2/04* | (2006.01) |
| *A47B 61/00* | (2006.01) |
| *F16B 12/32* | (2006.01) |
| *A47B 55/02* | (2006.01) |

(52) U.S. Cl.
CPC ........ *A47G 25/0678* (2013.01); *A47B 61/003* (2013.01); *F16B 2/04* (2013.01); *F16B 12/32* (2013.01); *F16M 13/022* (2013.01); *A47B 55/02* (2013.01)

(58) Field of Classification Search
CPC .. A47G 25/0678; A47G 25/08; A47B 61/003; A47B 55/02; F16B 2/04; F16B 12/32; F16M 13/022
See application file for complete search history.

(56) References Cited

U.S. PATENT DOCUMENTS

| 745,503 | A | | 3/1904 | Rubicam et al. |
| 1,371,619 | A | | 3/1921 | Greenstreet |
| 2,229,935 | A | | 1/1941 | Powers |
| 4,244,544 | A | | 1/1981 | Komat |
| 4,340,144 | A | | 7/1982 | Cousins |
| 4,607,753 | A | | 8/1986 | Radek |
| 4,678,151 | A | | 7/1987 | Radek |
| 4,722,648 | A | | 2/1988 | Camilleri |
| 4,726,554 | A | | 2/1988 | Sorrell |
| 4,826,120 | A | | 5/1989 | Newton et al. |
| 5,316,246 | A | | 5/1994 | Scott et al. |
| D352,195 | S | | 11/1994 | Rogers et al. |
| D354,864 | S | | 1/1995 | Kokenge et al. |
| 5,405,026 | A | | 4/1995 | Lee et al. |
| 5,437,380 | A | | 8/1995 | Peay et al. |
| D372,188 | S | | 7/1996 | Van Dyke |
| 5,531,416 | A | | 7/1996 | Remmers |
| 5,580,018 | A | | 12/1996 | Remmers |
| 5,582,377 | A | * | 12/1996 | Quesada ................. A47F 5/083 24/343 |
| 5,758,851 | A | | 6/1998 | Remmers |
| 5,910,351 | A | | 6/1999 | Davis et al. |
| 5,954,301 | A | | 9/1999 | Joseph et al. |
| D419,344 | S | | 1/2000 | Greene |
| 6,024,333 | A | | 2/2000 | Raasch et al. |

(Continued)

*Primary Examiner* — Eret C McNichols
(74) *Attorney, Agent, or Firm* — Hooker & Habib, P.C.

(57) ABSTRACT

A support adapted for mounting to wire shelving units, particularly a support adapted to be securely coupled and repositioned on upper and lower horizontally-extending wire members located at the front of wire shelving units. The support does not interfere with use of a shelving unit including the storage of items on the shelving unit or handing items under the shelving unit.

20 Claims, 14 Drawing Sheets

(56) References Cited

U.S. PATENT DOCUMENTS

| | | |
|---|---|---|
| 6,189,847 B1 | 2/2001 | Hart |
| 6,206,330 B1 | 3/2001 | Oi et al. |
| 6,364,266 B1 | 4/2002 | Garvin |
| 6,460,710 B1 | 10/2002 | Dardashti |
| 6,575,315 B2 | 6/2003 | Zidek |
| D488,054 S | 4/2004 | Myers |
| 6,969,036 B2 | 11/2005 | Magnusson |
| 7,004,335 B2 | 2/2006 | Remmers |
| D527,559 S | 9/2006 | Remmers |
| 7,175,143 B1 | 2/2007 | Ho |
| 7,185,772 B2 | 3/2007 | Remmers |
| D568,254 S | 5/2008 | Patchett et al. |
| D569,234 S | 5/2008 | Young, IV |
| D569,236 S | 5/2008 | Young, IV |
| D569,712 S | 5/2008 | Young, IV |
| D569,715 S | 5/2008 | Fernandez |
| 7,484,701 B2 * | 2/2009 | Hsieh ............... A47F 5/0853 211/106.01 |
| D589,899 S | 4/2009 | Huang et al. |
| 7,516,930 B2 | 4/2009 | Chen |
| D596,128 S | 7/2009 | Hung et al. |
| D617,741 S | 6/2010 | Fennell |
| 7,726,619 B2 | 6/2010 | Lien |
| D621,244 S | 8/2010 | Kundinger, Jr. et al. |
| 7,810,440 B2 | 10/2010 | Ward |
| 7,825,337 B2 | 11/2010 | Young, IV |
| 7,900,783 B2 | 3/2011 | Fernandez et al. |
| D638,690 S | 5/2011 | Hoek |
| D638,691 S | 5/2011 | Hoek |
| D638,692 S | 5/2011 | Hoek |
| 7,946,549 B2 | 5/2011 | Forrest et al. |
| 7,950,537 B1 | 5/2011 | Goodman et al. |
| D639,145 S | 6/2011 | Hoek |
| D639,146 S | 6/2011 | Hoek |
| D640,527 S | 6/2011 | Hoek |
| D644,501 S | 9/2011 | Chen |
| D657,869 S | 4/2012 | Mammen |
| 8,152,005 B2 | 4/2012 | Barkdoll et al. |
| D668,620 S | 10/2012 | Convert et al. |
| 8,308,116 B2 | 11/2012 | Daniels |
| D680,851 S | 4/2013 | Lo |
| 8,453,984 B2 | 6/2013 | Best et al. |
| 8,579,121 B2 | 11/2013 | Egn et al. |
| 8,646,624 B2 | 2/2014 | Fernandez et al. |
| 8,998,151 B2 | 4/2015 | Hoek |
| 9,027,767 B2 | 5/2015 | Buckley et al. |
| 9,049,931 B2 | 6/2015 | Brinton, Jr. et al. |
| 9,108,096 B2 * | 8/2015 | Solheim ............ A63B 69/3632 |
| 9,149,119 B2 | 10/2015 | Hansel et al. |
| D742,212 S | 11/2015 | Hsu |
| D743,048 S | 11/2015 | Kuran |
| D749,209 S | 2/2016 | Uhlenkamp et al. |
| 9,345,343 B2 | 5/2016 | Sobb |
| D767,500 S | 9/2016 | Byrne et al. |
| D768,089 S | 10/2016 | Liu |
| D773,414 S | 12/2016 | Hoffman |
| D774,002 S | 12/2016 | Hsieh |
| 9,618,143 B2 | 4/2017 | Noble |
| D790,127 S | 6/2017 | Verleur |
| 9,696,610 B2 * | 7/2017 | Truesdale ............ G03B 17/561 |
| 9,700,137 B2 | 7/2017 | Davis |
| 9,706,859 B2 | 7/2017 | Brinton, Jr. et al. |
| D799,941 S | 10/2017 | Rothenberg et al. |
| D802,168 S | 11/2017 | Lee |
| D803,164 S | 11/2017 | Noble |
| D805,879 S | 12/2017 | Garcia |
| D822,122 S | 7/2018 | Bilezikian et al. |
| D822,463 S | 7/2018 | Han |
| 10,021,975 B1 | 7/2018 | Womble |
| D832,682 S | 11/2018 | Ebersole |
| 10,376,059 B1 | 8/2019 | Ebersole et al. |
| 10,637,980 B1 * | 4/2020 | Nawas ................ F16M 11/041 |
| 2004/0118982 A1 | 6/2004 | Shillings et al. |
| 2005/0189453 A1 | 9/2005 | DeGuevara |
| 2005/0230577 A1 | 10/2005 | Chen |
| 2006/0011570 A1 | 1/2006 | Chen |
| 2006/0124811 A1 | 6/2006 | Tatarsky et al. |
| 2006/0231516 A1 | 10/2006 | Moore |
| 2006/0261230 A1 | 11/2006 | Lee |
| 2007/0012832 A1 | 1/2007 | Ottens et al. |
| 2007/0235597 A1 | 10/2007 | Winchester |
| 2009/0152424 A1 | 6/2009 | Forrest et al. |
| 2012/0068032 A1 | 3/2012 | Stockman |
| 2015/0053632 A1 | 2/2015 | Brinton, Jr. et al. |
| 2015/0265069 A1 | 9/2015 | Brinton, Jr. et al. |
| 2016/0320034 A1 | 11/2016 | Wessel |
| 2017/0367481 A1 | 12/2017 | Ebersole |
| 2018/0080485 A1 | 3/2018 | Wang |
| 2018/0228303 A1 | 8/2018 | Wills et al. |

* cited by examiner

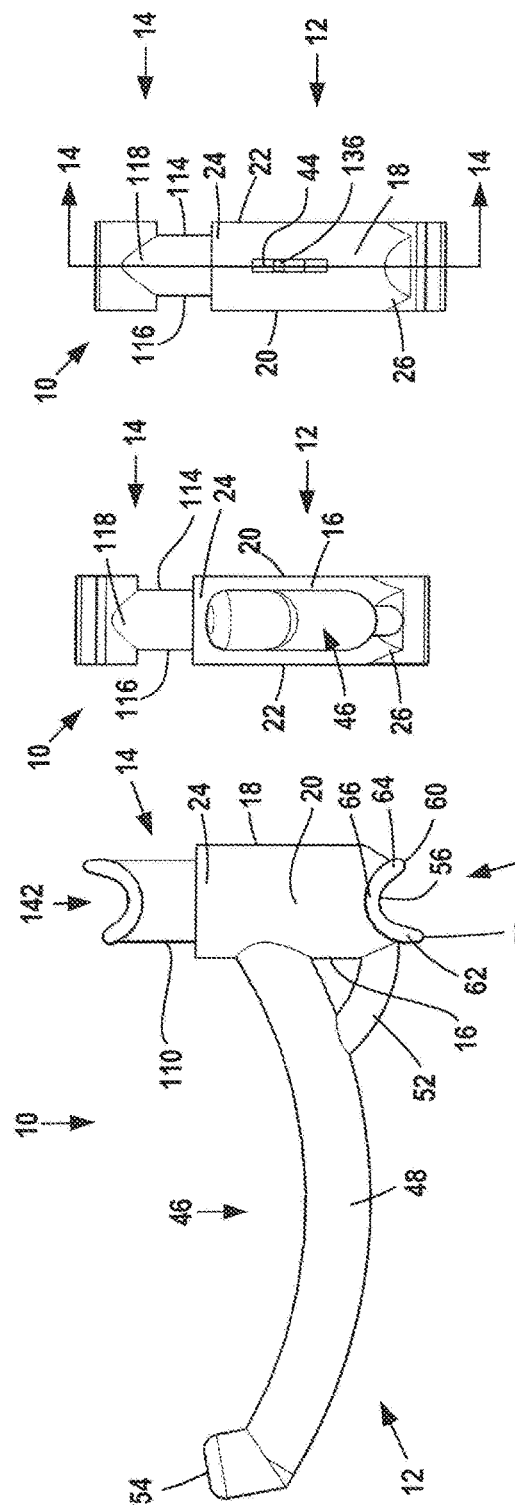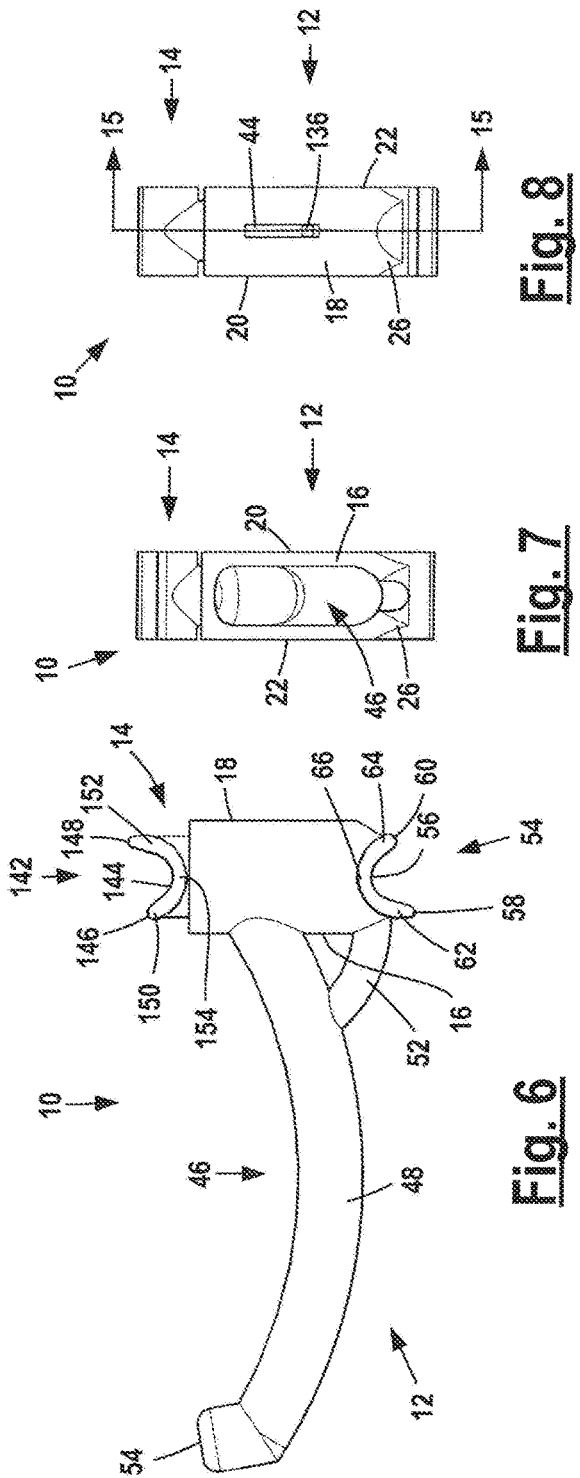

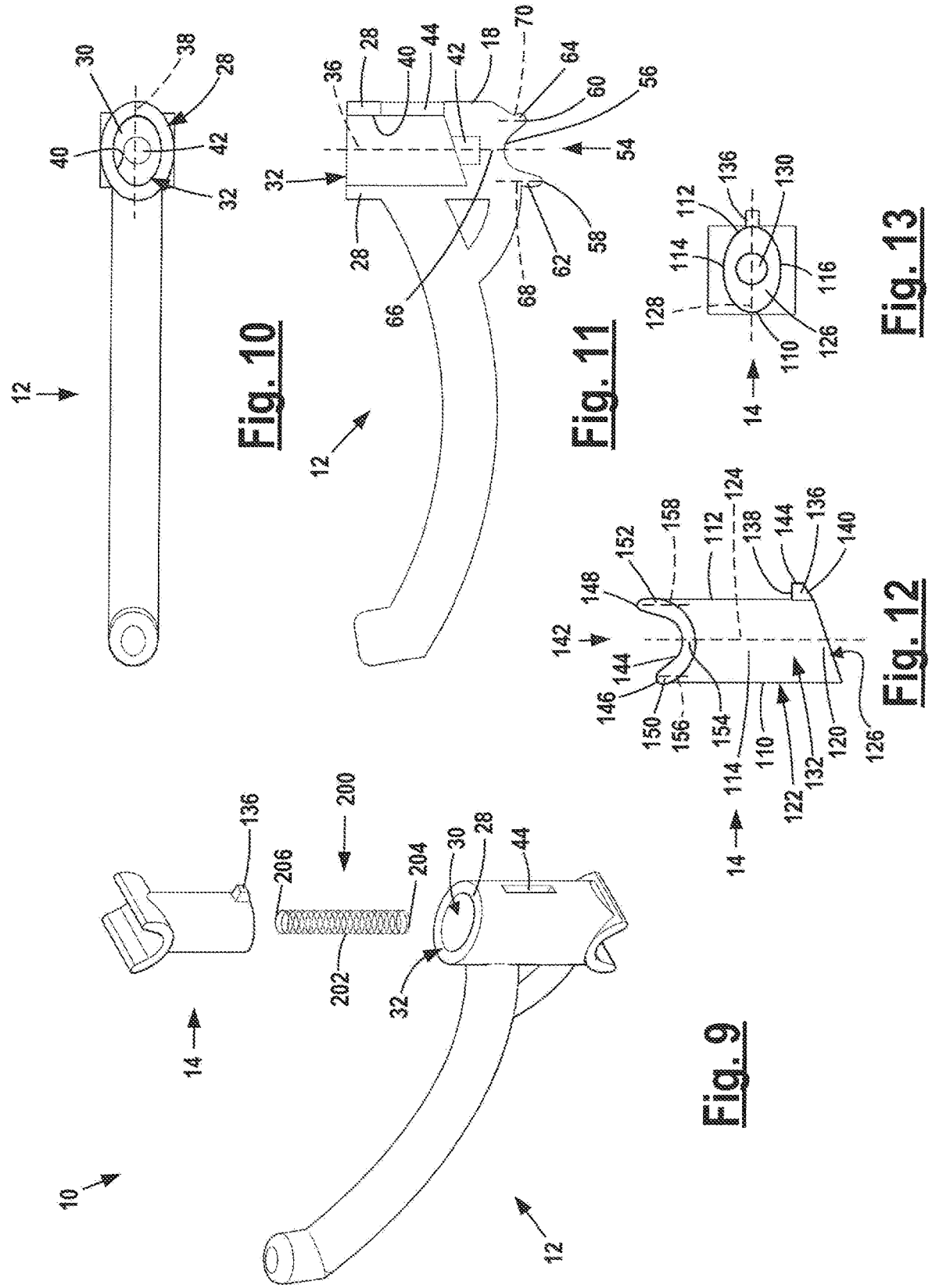

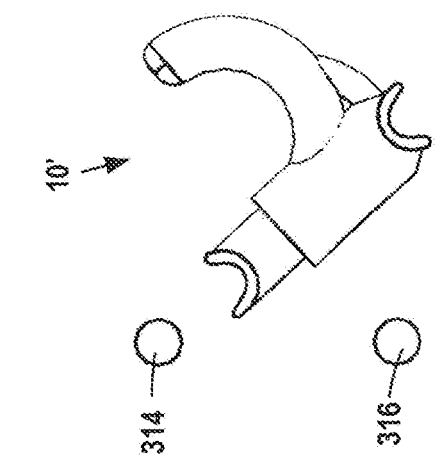
Fig. 19
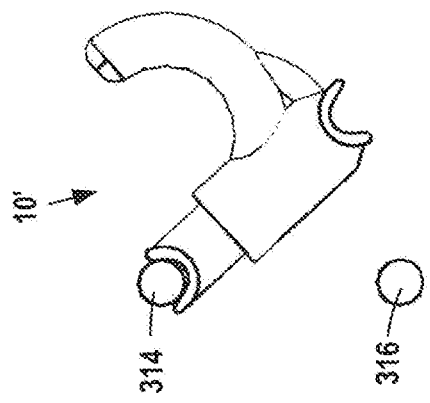
Fig. 20
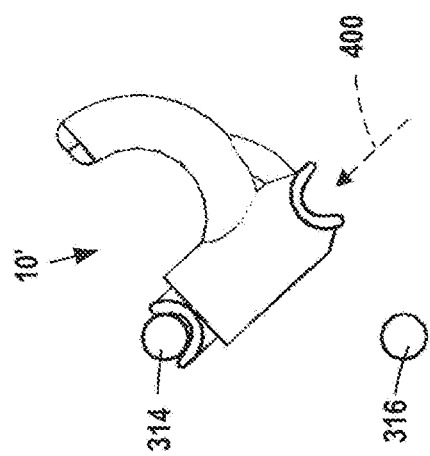
Fig. 21
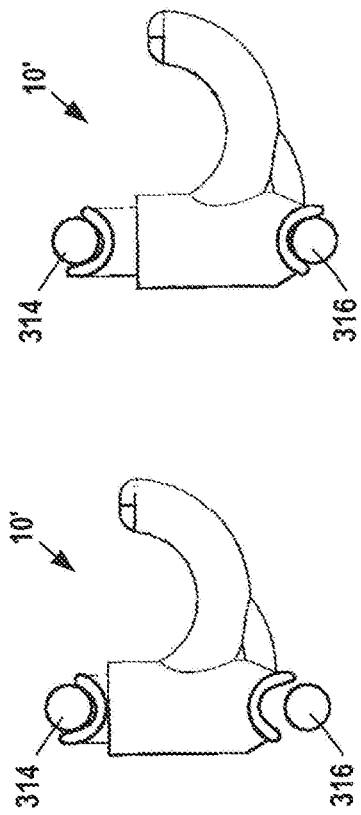
Fig. 22
Fig. 23
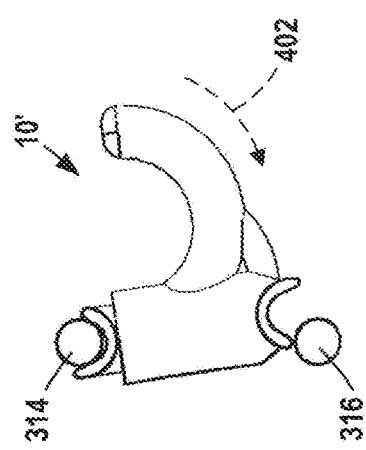
Fig. 24

SUPPORT ASSEMBLY FOR WIRE SHELF AND METHOD OF USE

FIELD OF THE DISCLOSURE

The disclosure relates to supports mounted onto wire shelving units, particularly supports having hooks or like engagement features to secure items in place. The disclosed support assembly is adapted to securely and releasably couple to wire members at the front of wire shelving units so that the support assembly does not interfere with use of the shelving unit.

BACKGROUND OF THE DISCLOSURE

Wire shelving units are commonly mounted in closets, wardrobes, workspaces and other locations to provide additional storage options. The units are typically constructed of elongate wire members of stainless steel or a like material that is powder coated, painted or has a like surface finish.

The wire shelving units typically include an upper, planar shelving area made up of a number of wire members and at least two horizontally-oriented wire members that extend along the front portion of the shelving area.

It is known to mount garment hangers, brackets, S-hooks and like accessories to wire shelving units to provide additional storage options. These accessories can interfere with shelving unit use as accessory elements extend into the top shelving area of the unit through gaps between wire members or impede access to the front of the shelving area. Existing accessories have multiple-element structures and separate fasteners that require separate fastener tools. This complicates installation and removal of the accessories from a shelving unit. S-hooks used with wire shelving units freely hang from lower unit wire elements. S-hooks rely on gravity to keep them in place and are not otherwise secured to the shelving units. This can result in S-hooks and hung items being inadvertently dislodged and falling from shelving units when a user adds or removes items therefrom.

In the case of support assemblies having plastic elements produced by injection molding techniques, it is desirable for the plastic elements to be formed from reduced amounts of material to reduce product production costs. It is also desirable for given solid plastic elements to be uniformly thin to prevent element warping during cooling steps after molding is complete. Moreover, in the case of support assemblies having elements that have a close fit tolerance between adjacent sliding elements, such the sliding fit of a telescoping column within an internal cavity, as disclosed in applicant's U.S. Pat. No. 10,376,059, retaining appropriate sizing tolerances between sliding elements while utilizing reduced amounts of material to reduce product production costs and improve molding steps.

Thus, there is a need for an improved support adapted for mounting to a wire shelving unit that does not interfere with shelving unit use, may be easily mounted and secured to a shelving unit without the need of additional tools and is simple to manufacture with reduced production costs.

SUMMARY OF THE DISCLOSURE

Disclosed is a support assembly and its method of use. The support assembly is adapted to be mounted on the front of wire shelving units.

The support assembly includes a spring-actuated telescoping column fitted within a receiving collar that facilitates engagement with upper and lower shelf wire members. The assembly may be installed and removed from a wire shelving unit by-hand without the need of additional tools. The assembly does not extend into the top shelving area of a shelving unit or impede access to the front of the shelving area.

The disclosed assembly is capable of supporting objects having weights many times that of the assembly. An assembly weighing a fraction of one pound is capable of supporting objects weighing up to approximately 80 pounds in weight without assembly failure.

The disclosed assembly includes a number of rib elements disposed about the telescoping column and/or the receiving collar to allow an appropriate sliding fit tolerance between the column and collar elements. The use of the ribs allows for assembly formation with reduced amounts of overall material to reduce production costs. In particular, the ribs allow for the use of thinner collar walls in the assembly, which provides an additional benefit of allowing for improved uniform cooling and reduced risk of element warping in the case of plastic assembly elements produced by injection molding techniques.

Other objects and features of the disclosure will become apparent as the description proceeds, especially when taken in conjunction with the accompanying drawing sheets illustrating the support.

DESCRIPTION OF THE DRAWINGS

FIG. 3 is a side view of the assembly in a non-compressed configuration;

FIG. 4 is a front view of the assembly in a non-compressed configuration;

FIG. 5 is a rear view of the assembly in a non-compressed configuration;

FIG. 6 is a side view of the assembly in a fully compressed configuration;

FIG. 7 is a front view of the assembly in a fully compressed configuration;

FIG. 8 is a rear view of the assembly in a fully compressed configuration;

FIG. 9 is a perspective exploded view of the assembly;

FIG. 10 is a top view of an assembly first body element;

FIG. 11 is a sectional side view of an assembly first body element;

FIG. 12 is a side view of an assembly second body element;

FIG. 13 is a bottom view of an assembly second body element;

FIGS. 19 through 24 are representational side views showing the process of installing the assembly onto a wire shelving unit.

DETAILED DESCRIPTION OF THE INVENTION

Figure 1:
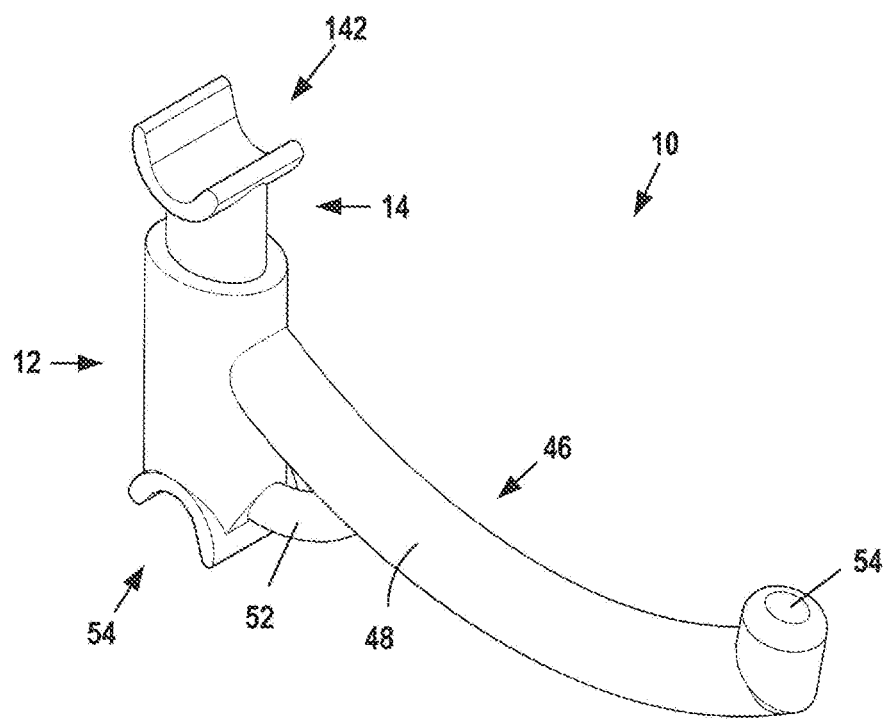
FIG. 1 is a perspective view of a support assembly in a non-compressed configuration.
Figure 2:
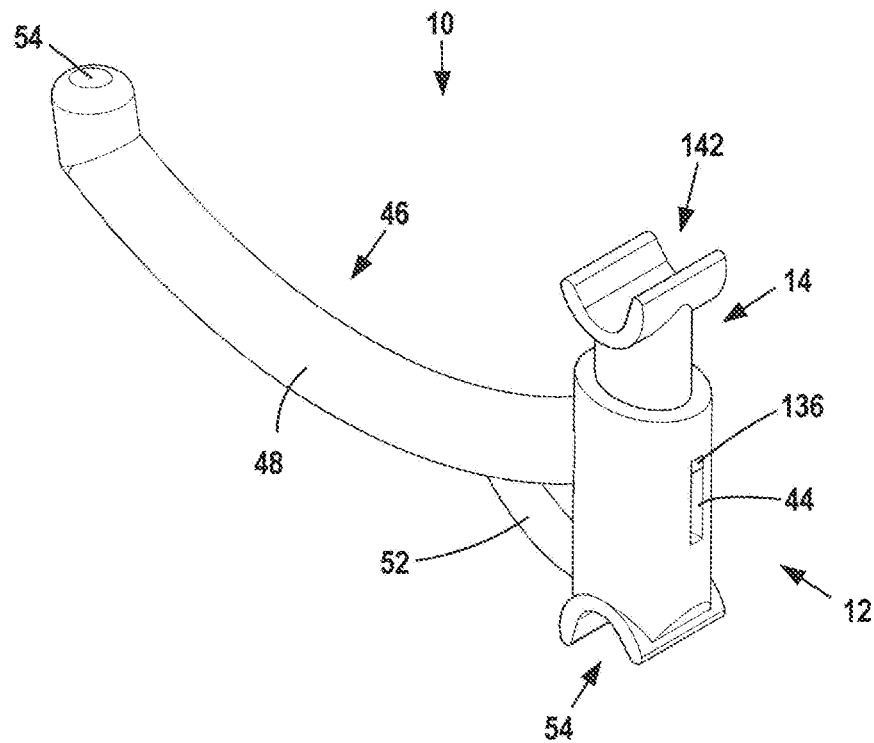
FIG. 2 is an alternate perspective view of the assembly in a non-compressed configuration.
Figure 14:
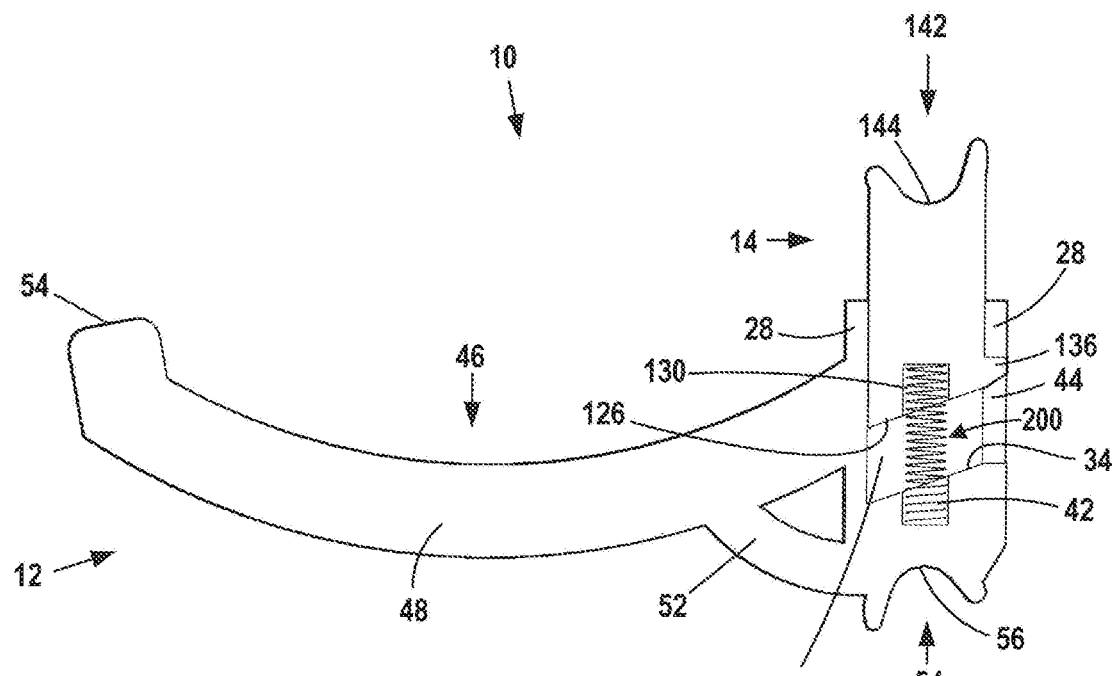
FIG. 14 is a sectional side view of the assembly taken along line 14-14 of FIG. 5.
Figure 15:
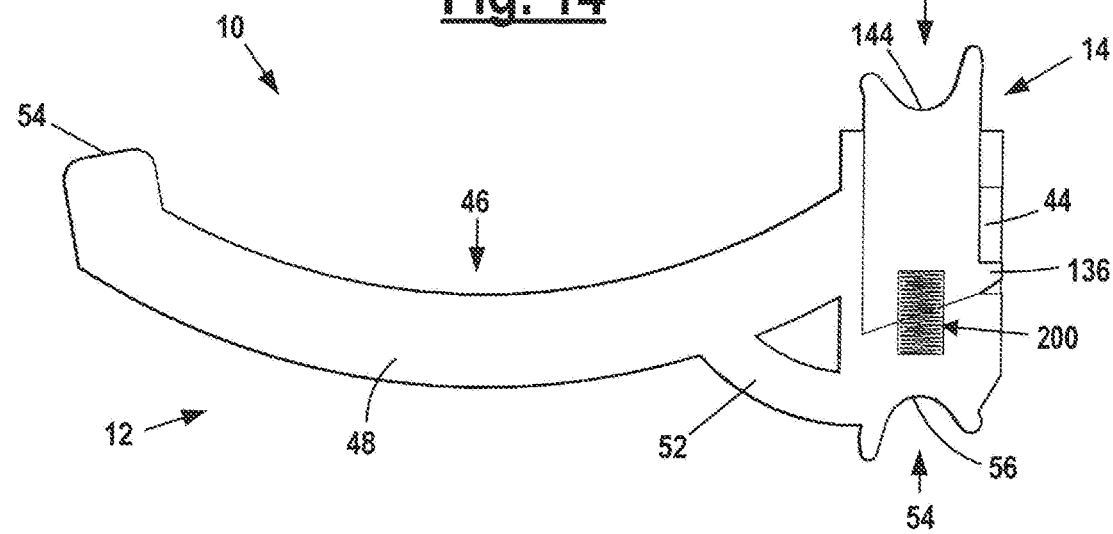
FIG. 15 is a sectional side view of the assembly taken along line 15-15 of FIG. 8.

FIG. 1 is a perspective view of a first embodiment support assembly 10.

Assembly 10 is made up of first and second body elements 12 and 14.

Body elements 12 and 14 may be formed from a rigid material, including plastics, metals or the like. In certain embodiments, elements 12 and 14 may be plastic elements formed by known injection molding techniques, or elements formed from thermoplastic polymers or polycarbonate material.

Body element 12 has front portion 16, rear portion 18, side portions 20, 22, top portion 24 and bottom portion 26.

A first body wall or collar 28 having a generally uniform thickness surrounds and defines body cavity 30 within body element 12. Cavity 30 extends from cavity opening 32 at the top 24 of body 12 to cavity floor 34. Cavity 30 may have a generally uniformly cylindrical shape and extend generally vertically along a first body cavity axis 36.

In embodiments, body cavity 30 may be generally oval-shaped so that cavity opening 32 is generally likewise oval-shaped with a major axis 38 extending between body front 16 and body rear 18. See FIG. 10.

Body element 12 collar 28 has an internal cavity or collar surface 40.

Cavity floor 34 may include a retention bore 42. In embodiments, retention bore 42 may be generally cylindrical in shape.

In embodiments cavity floor 34 may be angled and slope upward from body front 16 to body rear 18. See FIG. 11.

Body element 12 may include a retention slot 44 extending generally vertically along body 12 and through first body wall or collar 28. Retention slot 44 may be continuous with body cavity 30 as illustrated in the present figures. In alternate embodiments, retention slot 44 may extend from body cavity 30 partially into first body wall or collar 28.

Figure 25:
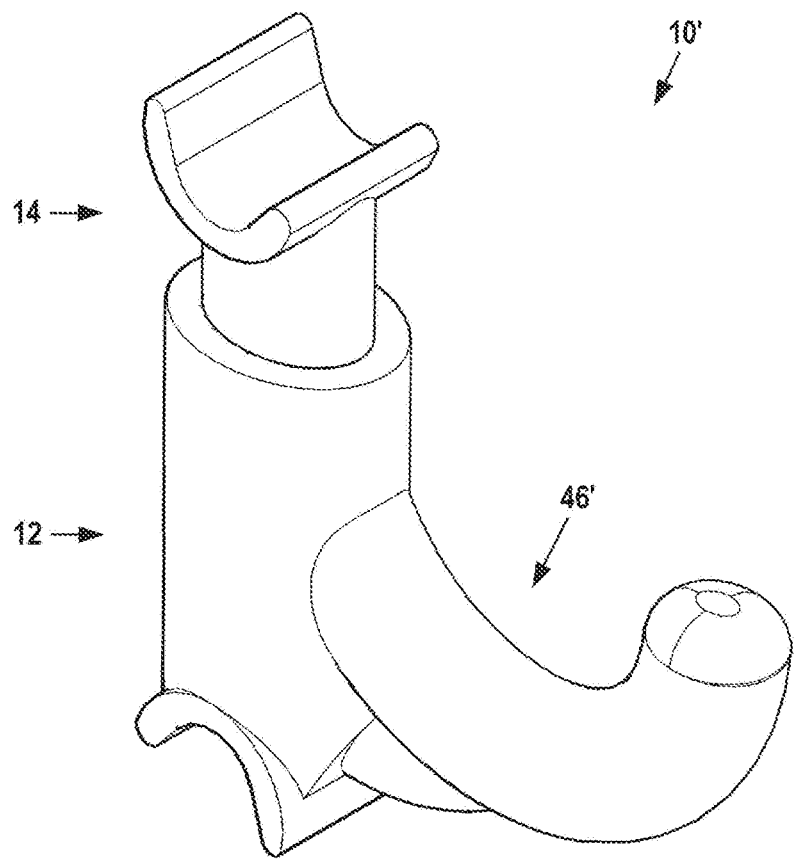
FIG. 25 is a perspective view of a second embodiment support assembly.
Figure 26:
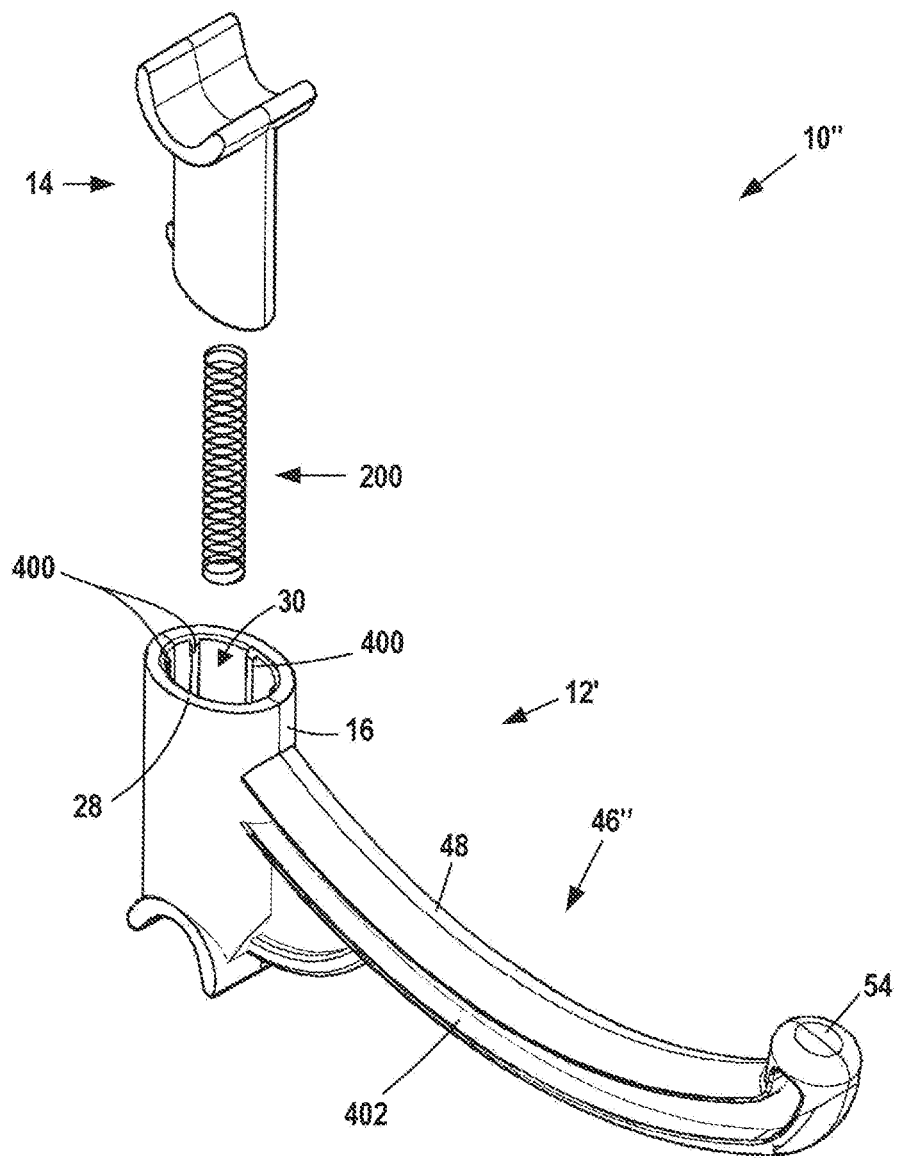
FIG. 26 is a perspective exploded view of a third embodiment assembly.
Figure 27:
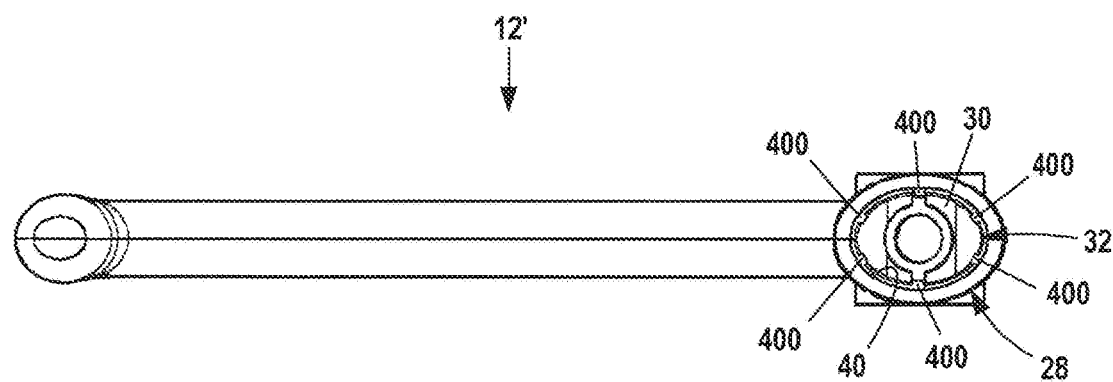
FIG. 27 is a top view of an alternate embodiment first body element.
Figure 28:
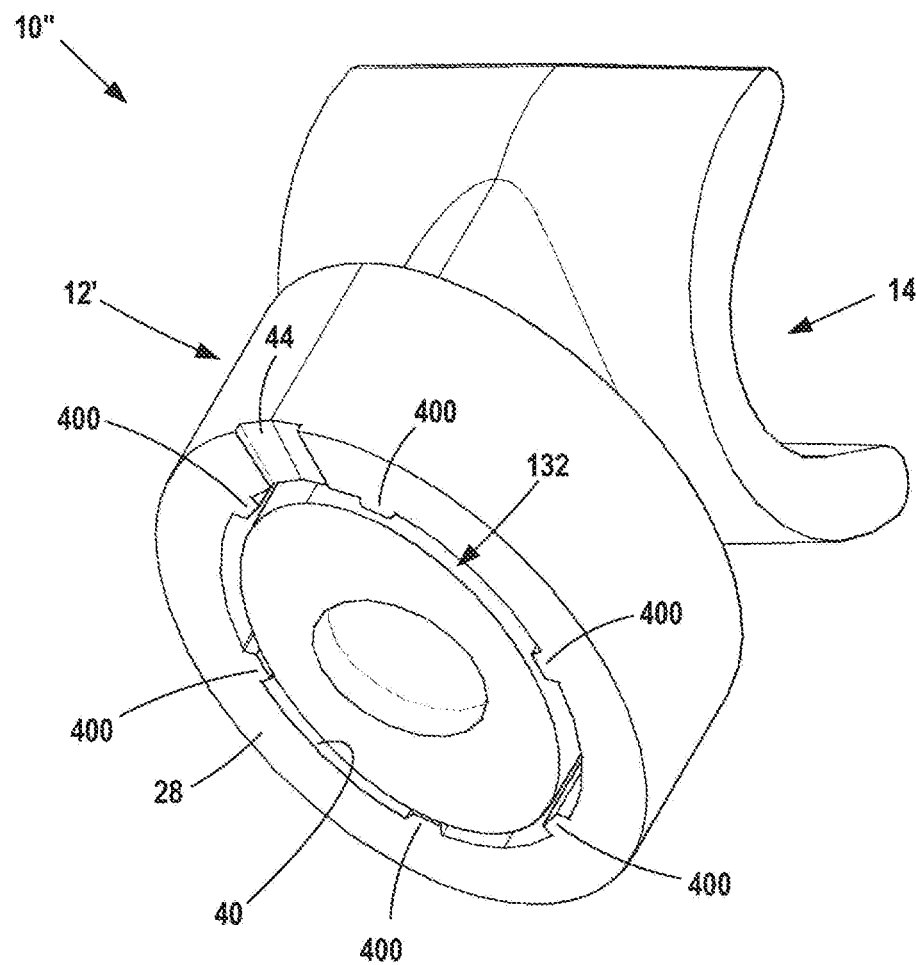
FIG. 28 is a sectional cutaway view of the third embodiment assembly.

Body element 12 may include an engagement hook 46 extending away from body front 16 along hook arm 48 to hook end 54. Engagement hook 46 may include a support strut 52 extending away from body front and engaging hook arm 48 to provide additional load support capacity. In alternate embodiments, engagement hook 46 may have different shapes, including longer, shorter or differently shaped hook arms 48. For instance, see alternate embodiment engagement hook 46' shown on second embodiment support assembly 10' shown in FIG. 25.

Body 12 includes engagement mouth 54 located at body bottom 26. Mouth 54 includes wire engagement surface 56 which extends generally between mouth front edge 58 and mouth rear edge 60. Edges 58 and 60 are located proximate mouth front wall 62 and mouth rear wall 64 respectively, walls 62 and 64 extending downwardly and away from body 12 and body bottom 26.

Wire engagement surface 56 is concave having a generally smooth, curved surface. In embodiments wire engagement surface 56 may be parabolic in shape. A parabolic-shaped engagement surface 56 allows engagement mouth 54 to engage wire shelving units having wire members of different sized diameters.

Mouth walls 62 and 64 may extend different distances away from body 12 and mouth base 66. For example, in embodiments, mouth front wall 62 may extend a distance 68 away from the mouth base 66, and mouth rear wall 68 may extend a distance 70 from mouth base 66, distance 68 greater than distance 70. In such embodiments, mouth front edge 58 is likewise located a greater distance from mouth base 66 than mouth rear edge 60. See FIG. 11.

Body element 14 has front portion 110, rear portion 112, side portions 114, 116, top portion 118 and bottom portion 120.

Body element 14 has a body column 122 that extends between the top 118 of body 14 to the bottom 120 of body 14. Column 122 may have a generally uniformly cylindrical shape and extend generally vertically along a center axis 124 ending at a column bottom or end surface 126 proximate bottom 120.

In embodiments, body column 122 may be generally oval-shaped, with a major axis 128 extending generally between body front 110 and body rear 112. See FIG. 13.

Column bottom surface 126 may include a retention bore 130. In embodiments, retention bore 130 may be generally cylindrical in shape.

Body column 122 includes generally cylindrical body column outer surface 132.

Column bottom surface 126 may be angled and slope upward from body front 110 and body rear 112. See FIG. 12. In embodiments the upward slope of column bottom surface 126 may be generally similar to the upward slope of cavity floor 34.

Body element 14 may include a retention flange 136 extending away from body column 122 and body column outer surface 132.

Flange 136 is adapted to fit within and slide along retention slot 44 in assembly 10. Flange 136 may include a top surface 138 to engage the top of slot 44 and an angled bottom surface 140. When assembled, flange outer surface 144 may be generally flush with the outer surface of first body 12 wall or collar 28.

Body 14 includes engagement mouth 142 located at body top 118. Mouth 142 is generally similar in structure to mouth 54 described herein, but for having a generally mirror-image configuration as shown in the figures and described below.

Mouth 142 includes wire engagement surface 144 which extends generally between mouth front edge 146 and mouth rear edge 148. Edges 146 and 148 are located proximate mouth front wall 150 and mouth rear wall 152 respectively, walls 150 and 152 extending upwardly and away from body 14 and body top 118.

Wire engagement surface 144 is concave having a generally smooth, curved surface. In embodiments wire engagement surface 144 may be parabolic in shape, like above disclosed wire engagement surface 56. A parabolic-shaped engagement surface 144 allows engagement mouth 142 to engage wire shelving units having wire members of different sized diameters.

In embodiments, surfaces 144 and 56 may be generally identical to one another.

Mouth walls 150 and 152 may extend different distances away from body 14 and mouth base 154. For example, in embodiments, mouth front wall 150 may extend a distance 156 away from mouth base 154, and mouth rear wall 152 may extend a distance 158 from mouth base 154, distance 158 greater than distance 156. In such embodiments, mouth rear edge 148 is likewise located a greater distance from mouth base 154 than mouth front edge 146. See FIG. 12.

In alternate embodiments, second body element 14 may include an engagement hook (not illustrated) extending away from body front 16 and generally similar to engagement hook 46.

Spring assembly 200 is located between first body element 12 and second body element 14.

Spring assembly 200 is substantially made up of a spring 202. Spring 202 may be a conventional coil or helical compression spring having first and second spring ends 204, 206.

Spring assembly 200 engages first body element 12 and second body element 14 in assembly 10 as explained below.

Assembly 10 is assembled by fitting second body element 14 body column 122 into first body element 12 body cavity 30 so that retention flange 136 fits into retention slot 44. During initial insertion, body element 12 may be deformed to fit column 122 and flange 136 within cavity 30. Once column 122 is placed within retention slot 44 it is secured from disassembly by flange 136 being constrained along slot 44.

Body column 122 is sized to fit body cavity 30 to allow a sliding connection between first body element 12 and second body element 14. The sliding connection has a close sliding fit tolerance between column 122 and cavity 30 internal cavity surface 40. The close sliding fit tolerance allows smooth vertical movement of column 122 relative to cavity 30 while maintaining substantially full contact between column 122 and surface 40.

Spring assembly 200 is placed between first body element 12 and second body element 14 before assembly as shown generally in exploded view FIG. 9. First spring end 204 may engage first body retention bore 42. Second spring end 206 may engage second body retention bore 130. Spring ends 204, 206 may be secured within retention bores 42, 130 by interference fits.

Figure 16:
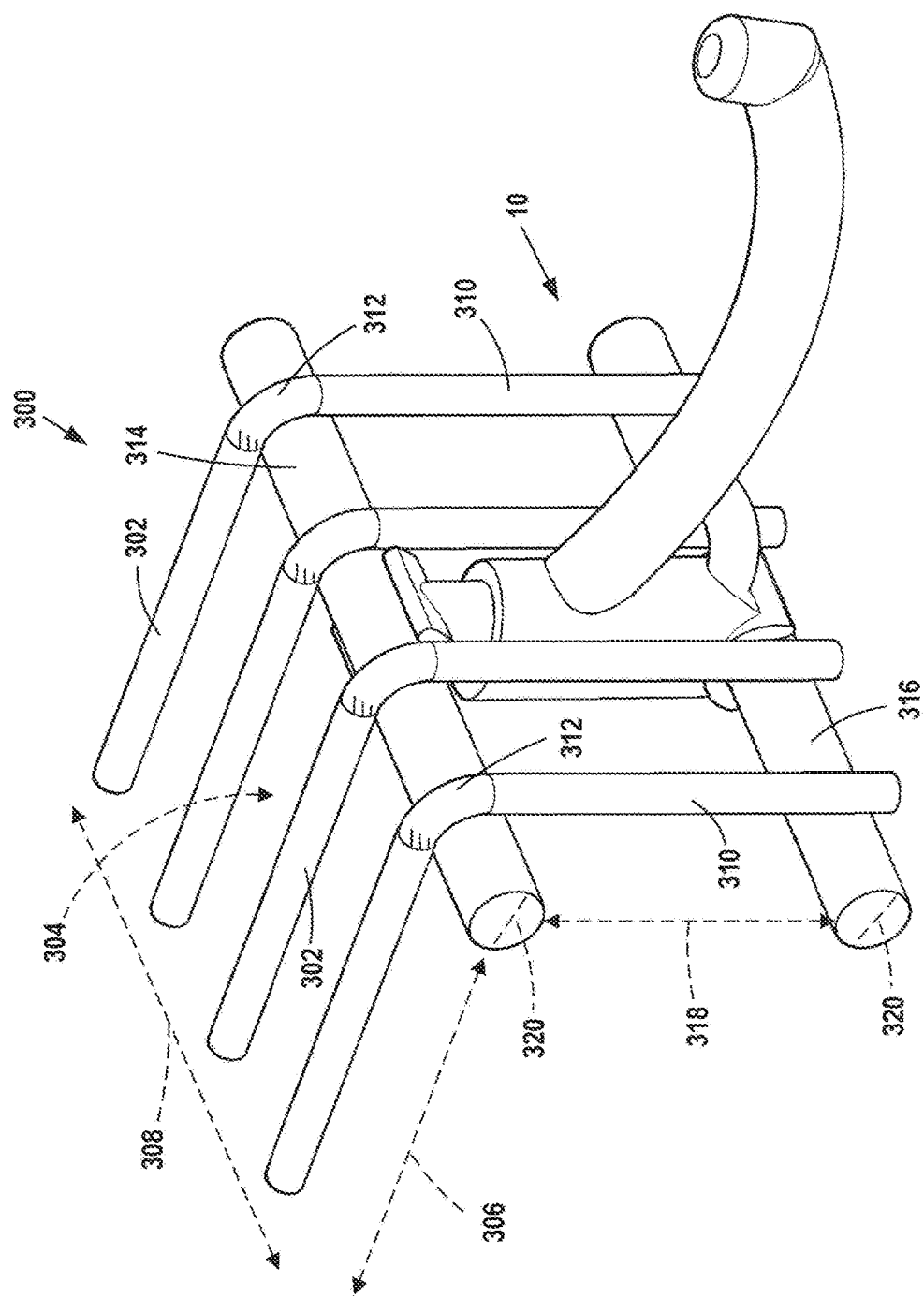
FIG. 16 is a perspective view of the assembly installed on a wire shelving unit in a partially-compressed configuration.
Figure 17:
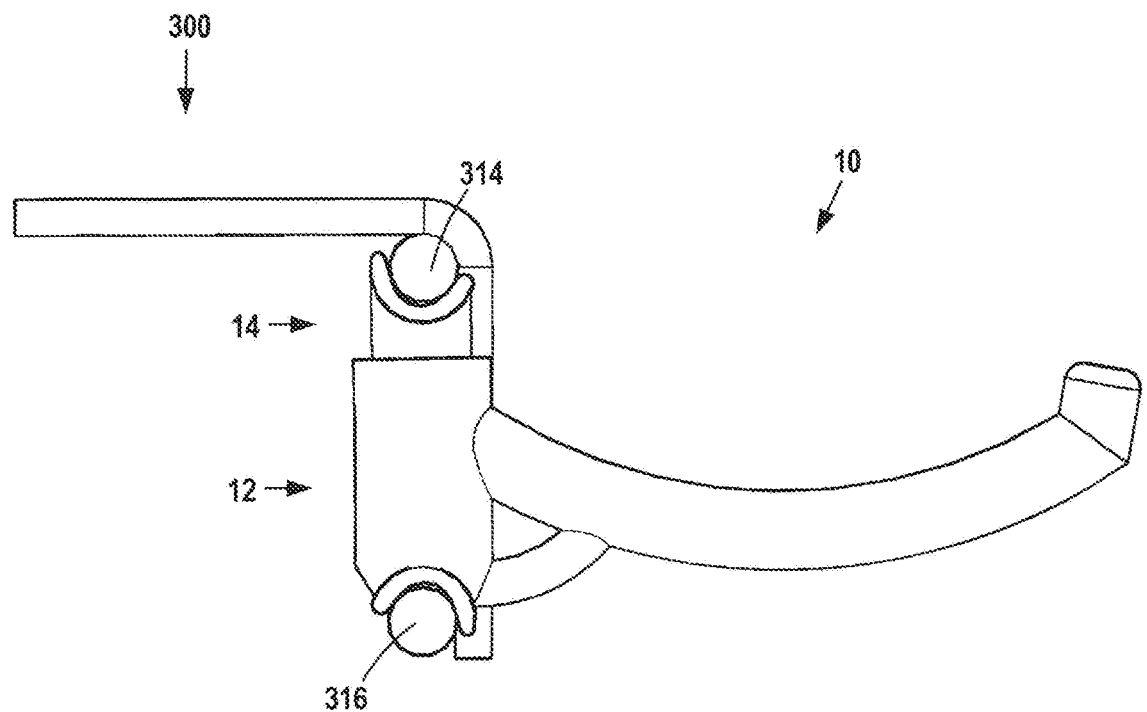
FIG. 17 is a side view of the assembly installed on a wire shelving unit in a partially-compressed configuration.
Figure 18:
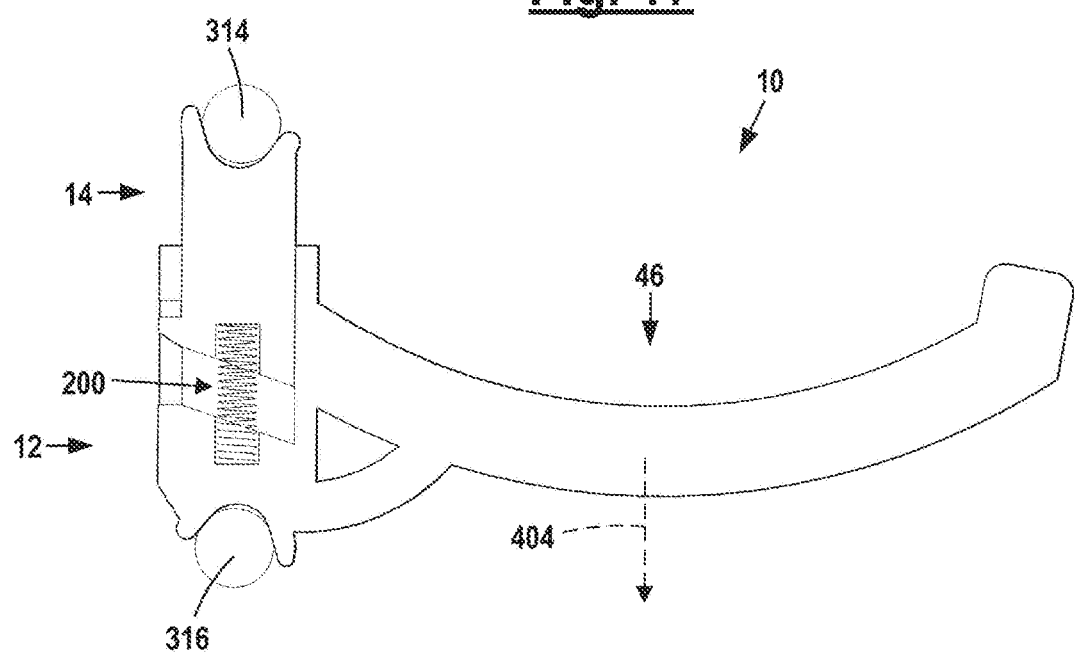
FIG. 18 is a sectional side view of the assembly installed on a wire shelving unit in a partially-compressed configuration.

Assembly 10 has non-compressed configurations as shown in FIGS. 1-5 and 14, fully compressed configurations as shown in FIGS. 6-8 and 15 and partially-compressed configurations as shown in FIGS. 16-18.

In a non-compressed configuration, largely un-compressed spring assembly 200 exerts opposed forces on first and second body elements 12 and 14 to bias or force elements 12 and 14 away from each other. As elements 12 and 14 are biased or forced away from each other, engagement mouths 54, 142 are likewise biased or forced away from each other. In a completely non-compressed configuration, flange 136 is located at the top of retention slot 44.

A compression force may be applied to first and second body elements 12 and 14 to compress spring assembly 200 move elements 12 and 14 toward each other. As a compression force is applied and elements 12 and 14 move toward each other, flange 136 likewise moves away from the top of retention slot 44. See FIG. 15.

Use of assembly 10 will now be described.

FIGS. 16 and 17 illustrate assembly 10 installed on a wire shelving unit 300. Unit 300 is made up of a number of wire elements 302 making up a shelving area 304 located in a plane extending between a shelf width 306 and a shelf length 308. Wire elements 302 extend vertically downward from shelving area 304 to form a number of supports 310 located at the front portion 312 of shelving area 304. Supports 310 are joined to horizontally-extending upper and lower wire members 314, 316. Members 314, 316 extend generally parallel to shelf length 308 and to each other along unit front of 312. Members 314, 316 are located a vertically-extending wire member distance 318 from each other. Upper and lower wire members 314, 316 have generally similar, circular cross sectional areas with like diameters 320.

In certain embodiments, the size of upper and lower wire members 314, 316 may be different, having dissimilar circular cross sectional areas and diameters.

As best seen in FIG. 17, when support 10 is installed on a wire shelving unit 300, the support does not contact or interfere with use of shelving area 304. Likewise, hook 46 does not interfere with items located below unit 300 and lower wire member 316.

FIGS. 19 through 24 illustrate the process of installing support 10 onto the upper and lower wire members 314, 316 of a wire shelving unit 300.

FIG. 19 shows a fully uncompressed assembly 10' located adjacent unit 300 so that engagement mouth 142 is located proximate upper wire member 314.

FIG. 20 shows upper engagement mouth 142 placed into engagement with upper wire member 314 to that upper mouth surface 144 contacts member 314.

FIG. 21 shows a compression force exerted onto assembly 10' body element 12 toward body element 14 in the direction of arrow 400. As element 14 is restricted from movement by wire member 314, the compression force acts to compress spring assembly 200 and move body element 12 toward body element 14 and likewise move assembly 10' into a compressed configuration.

Assembly 10' is then rotated in the direction of arrow 402 so that engagement mouth 54 is positioned proximate and over lower wire member 316. See FIGS. 22 and 23.

The compression force is then released so that body elements 12 and 14 are biased away from each other by spring assembly 200 and engagement mouth 54 engages lower wire member 316 so that mouth surface 56 contacts member 316. In engagement with wire shelving unit 300, assembly 10' is moved into a partially-compressed configuration. See FIGS. 24 and 18.

Assembly 10' is uninstalled from wire shelving unit 300 by reversing the above steps.

Elements of assembly 10 assist in its ability to bear weight loads. As illustrated in FIG. 18, as a load is placed on engagement hook 46, a downward force 404 is likewise applied to the assembly. Force 404 translates load forces to first and second body elements 12 and 14. These load forces translate generally from the front and rear of the assembly between the major axis 128 extending through of body column 122 and the major axis 38 extending through first body wall or collar 28 of body cavity 30. The load is translated to shelving unit 300 wire members 314, 316 at engagement mouths 54, 142. First and second mouth walls 62, 64, 150 and 152 secure assembly 10 in place. The parabolic shape of engagement surfaces 56, 144 help assure frim contact between the engagement mouths 54, 142 and wire members 314, 316.

Assembly 10 may be installed and uninstalled from appropriately sized wire shelving units 300 multiple times without the need of additional parts or the use of tools.

Assembly 10 can be adapted to fit different shelving units 300 having different distances 318 between wire members 314 and 316. Likewise, assembly 10 can be adapted to fit different shelving units 300 having wire members 314 and 316 having various circular cross sectional areas of different sizes and different diameters 320.

FIGS. 26 through 30 illustrate a third embodiment support assembly 10".

Support assembly 10" shares elements in common with above disclosed assembly 10 and is made up of first body element 12' and second body element 14.

First body element 12' is generally similar to first body element 12 described above, having a generally uniform first body wall or collar 28 that surrounds and defines body cavity 30, as described in first body element 12 above.

First body element 12' internal cavity surface 40 includes a number of ribs or projections 400 that extend away from internal cavity or collar surface 40.

In embodiments, first body element 12' may include engagement hook 46" having a channel 402 extending generally along the length of hook arm 48 from body front 16 to hook end 54.

In embodiments, first body element 12' includes a plurality of ribs or projections 400. In particular embodiments, first body element 12' may have six ribs or projections 400 located around internal cavity or collar surface 40.

Figure 29:
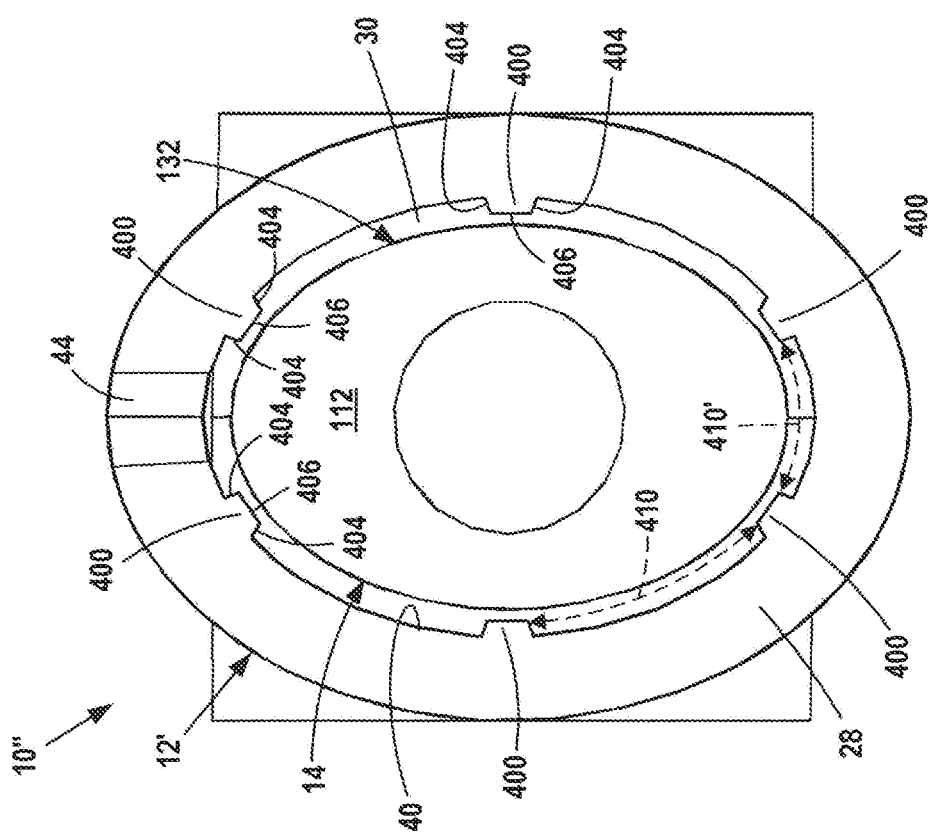
FIG. 29 is a plan view of the third embodiment assembly like FIG. 28.
Figure 31:
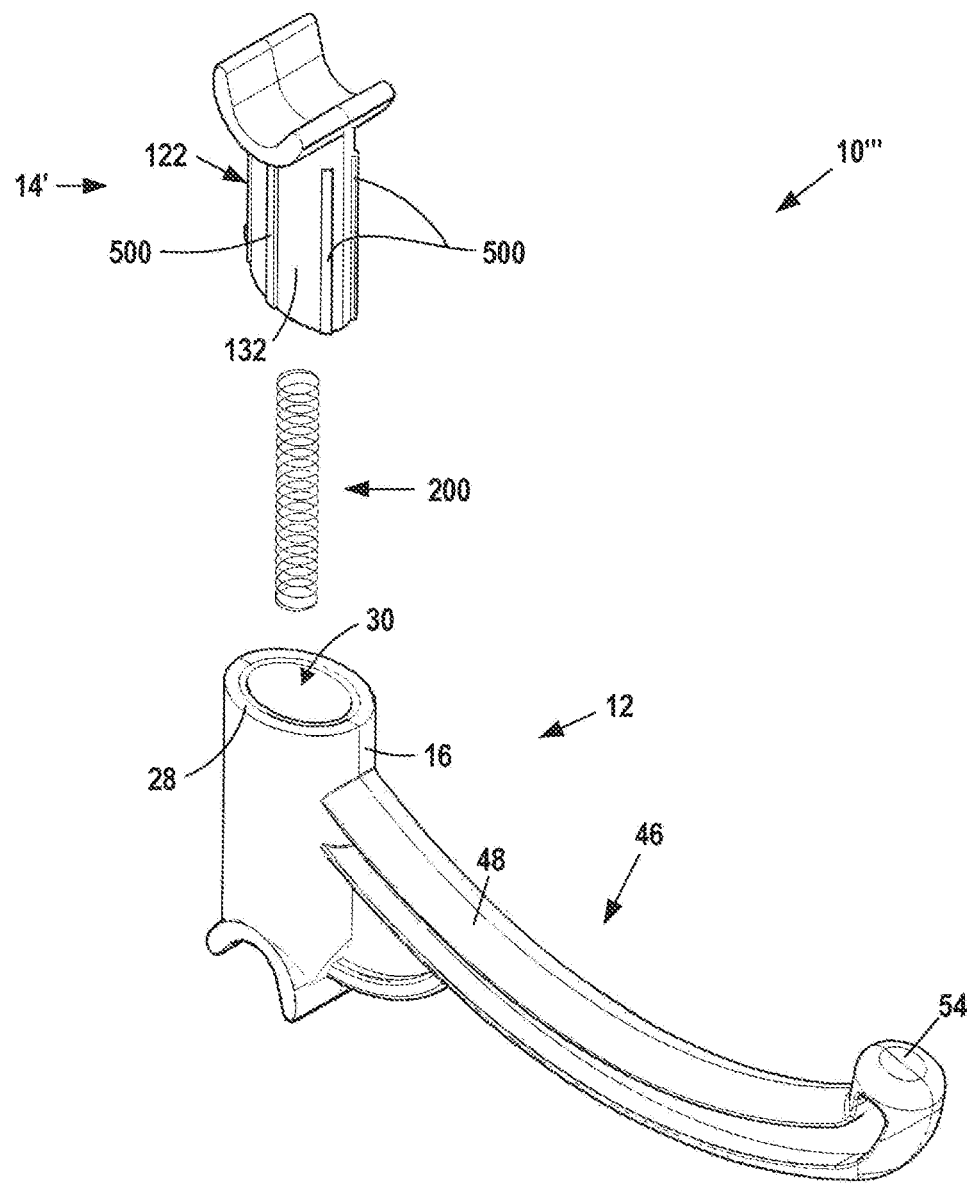
FIG. 31 is a perspective exploded view of a fourth embodiment assembly.
Figure 32:
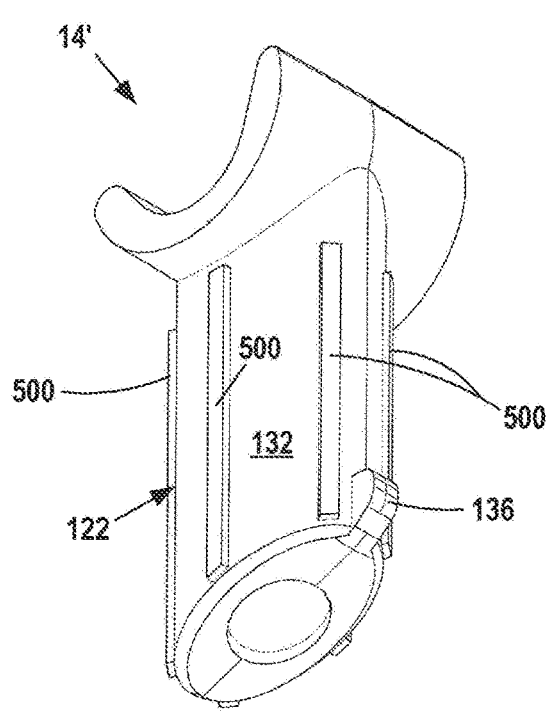
FIG. 32 is a perspective view of an alternate embodiment second body element.
Figure 33:
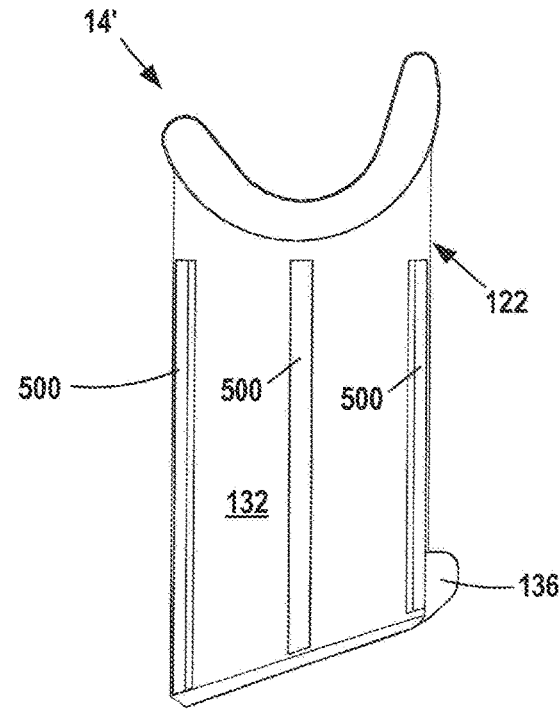
FIG. 33 is a side view of an alternate embodiment second body element.
Figure 34:
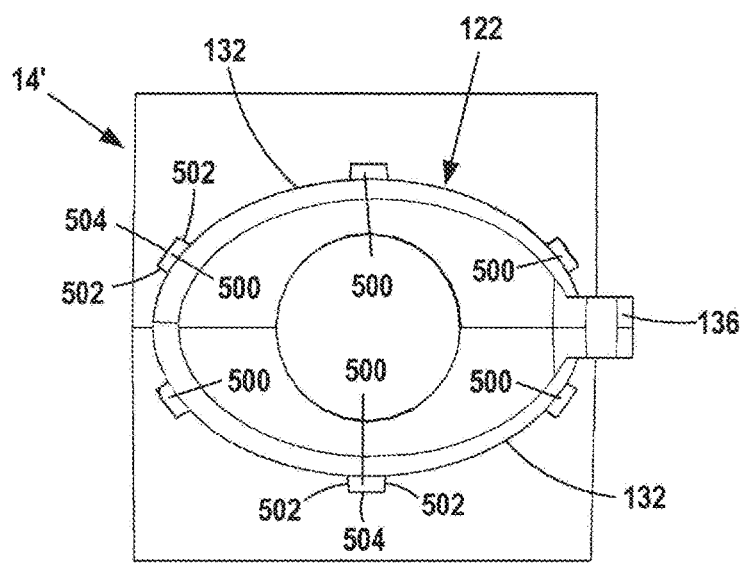
FIG. 34 is a bottom view of an alternate embodiment second body element.
Figure 36:
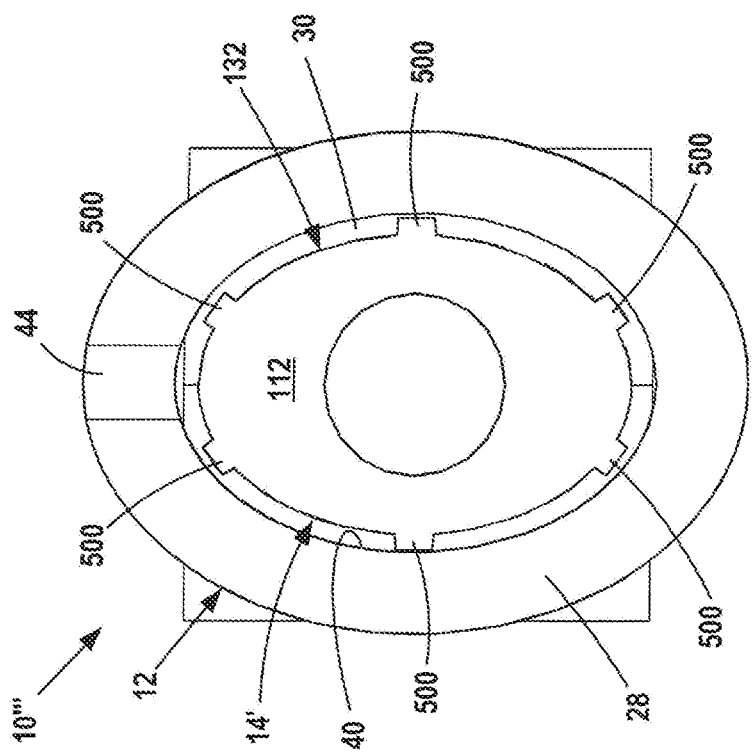
FIG. 36 is a plan view of the fourth embodiment assembly like FIG. 35.
Figure 35:
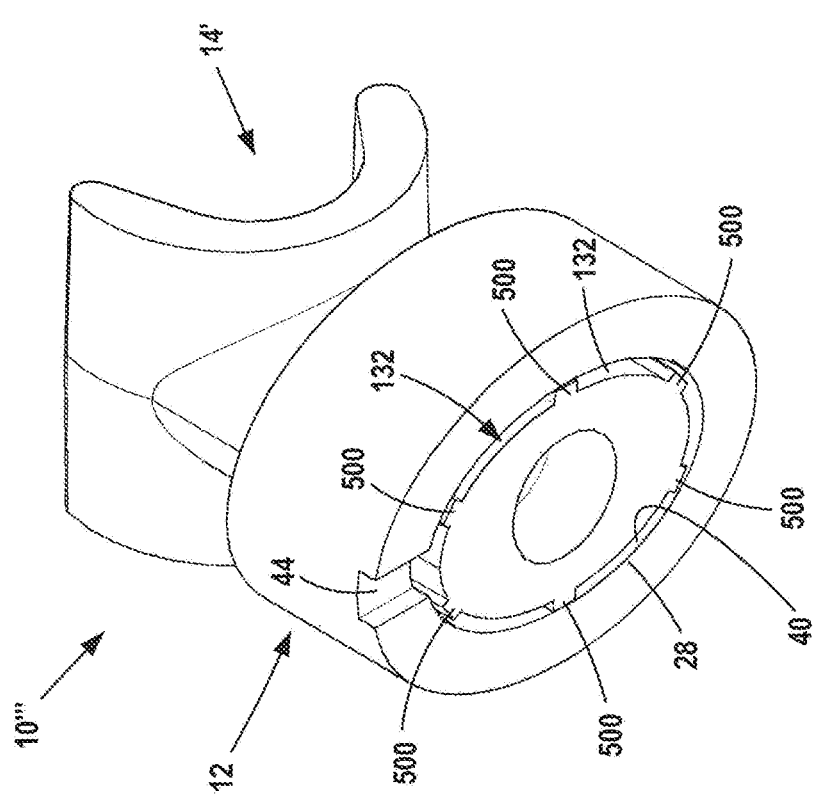
FIG. 35 is a sectional cutaway view of the fourth embodiment assembly.

In embodiments, ribs or projection 400 may be located at regular distances 410 about cavity surface 40. In alternate embodiments, ribs or projection 400 may be located at irregular distances 410 about cavity surface 40. See particularly larger distance 410 and smaller distance 410' about cavity surface 40 as shown in FIG. 29.

In particular embodiments, more or less than six ribs or projections 400 may be located at locations about internal cavity or collar surface 40.

As shown in FIGS. 26-29 ribs or projections 400 may be generally rectangular in shape with a rectangular cross-section and having a pair of rib side walls 404 extending from internal collar surface 40 to a generally flat rib bearing surface 406.

In support assembly 10", first body element 12' rib bearing surface 406 is in contact with second body element 14 column outer surface 132. Weight loads are transmitted between first body element 12' and second body element 14 at the interface between rib bearing surface 406 and column outer surface 132.

Figure 30:
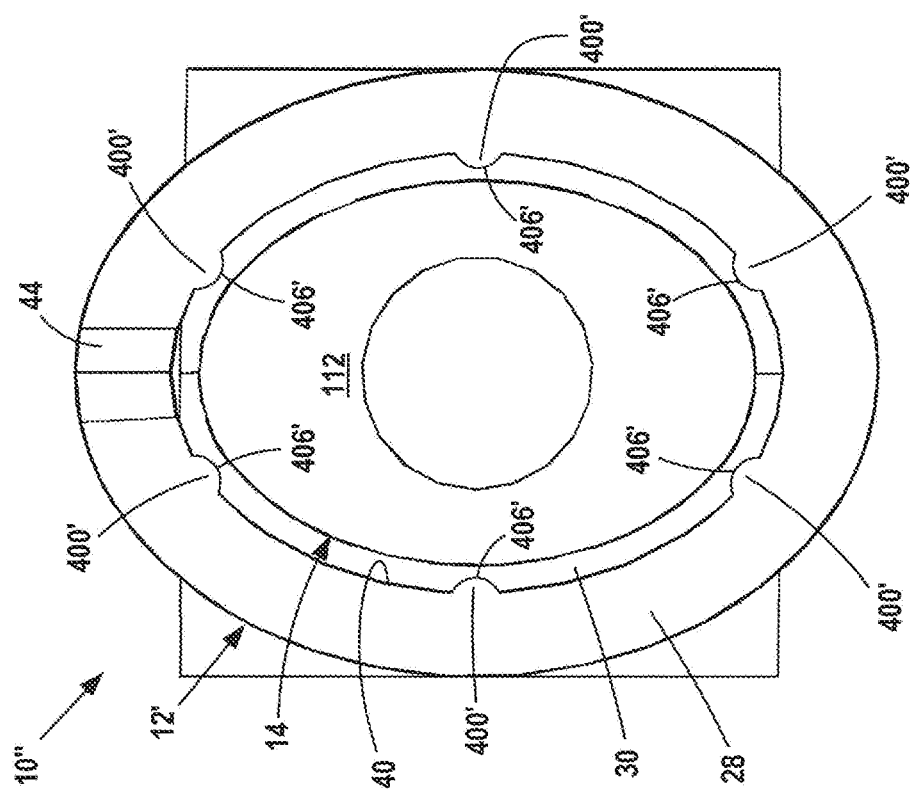
FIG. 30 is a plan view of like FIG. 28 illustrating alternate embodiment ribs or projections in the assembly.

While FIGS. 26-29 show the use of generally rectangular ribs or projections 400, other rib shapes are possible. FIG. 30 shows use of an alternate embodiment rib 400' having a semi-circular shape with a semi-circular cross-section. Rib 400' has curved rib bearing surface 406'.

The use of ribs 400 in assembly 10" offers advantages over prior art assemblies, including allowing use of less material to create a thinner body wall or collar 28 while still assuring an appropriate tolerance fit for body column 122 within cavity 30, simplifying assembly of second body element 14 column 122 within cavity 30 by allowing flange 136 to more easily be located within retention slot 44, adjusting the tolerance fit between rib bearing surfaces 406 and column outer surface 132 to assure an appropriate fit between first and second body elements 12 and 14.

In embodiments, the tolerance fit or distance between rib bearing surfaces 406 and column outer surface 132 may be in a range of 0.1 millimeter to 1.5 millimeters.

The use of thinner body walls in assembly 10" assists in the production process plastic molded assembly elements by allowing for the improved, uniform cooling of plastic pieces. The uniform cooling of plastic pieces reduces the risk of element warping in assembly elements produced by injection molding techniques.

FIGS. 31 through 36 illustrate a third embodiment support assembly 10'''.

As above, support assembly 10''' shares elements in common with above disclosed assembly 10 and is made up of first body element 12 and second body element 14'.

Second body element 14' is generally similar to second body element 14 described above, having a body column 122 with a generally cylindrical body column outer surface 132.

Second body element 14' body column outer surface 132 has a number of internal number of ribs or projections 500 that extend away from outer surface 132.

In embodiments, second body element 14' includes a plurality of ribs or projections 500. In particular embodiments, second body element 14' may have six ribs or projections 500 located generally evenly around column outer surface 132.

Similar to projections 400 described above, ribs or projection 500 may be located at regular distances around column outer surface 132. In alternate embodiments, ribs or projection 400 may be located at irregular distances around column outer surface 132.

In particular embodiments, more or less than six ribs or projections 500 may be located at locations around column outer surface 132.

Ribs or projections 500 may be generally rectangular in shape, having a pair of rib side walls 502 extending from column outer surface 132 to a generally flat rib bearing surface 504.

In support assembly 10''', second body element 14' rib bearing surface 504 is in contact with first body element 12 internal cavity or collar surface 40. Weight loads are transmitted between first body element 12 and second body element 14' at the interface between rib bearing surface 504 and internal cavity or collar surface 40.

While FIGS. 30-35 show the use of generally rectangular ribs or projections 500, other rib shapes are possible, such as ribs having a semi-circular profile as disclosed above.

While one or more embodiments of the assembly have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

The invention claimed is:

1. A support assembly for a wire shelf, the support assembly comprising:
   a first body having a first body front, a first body rear, a first body top and a first body bottom, the first body having a first body cavity and a first engagement mouth proximate the first body bottom;
   the first body cavity having an internal cavity surface and a generally round cross-section and extending from a cavity opening proximate the first body top to a cavity floor away from the cavity opening, the first engagement mouth having a first wire engagement surface, a first mouth front edge and a first mouth rear edge, said first mouth front edge and first mouth rear edge extending away from a first mouth base, said first mouth rear edge proximate said first body rear and said first mouth front edge proximate said first body front, the first wire engagement surface extending between said first mouth front edge and first mouth rear edge;

a second body having a second body front, a second body rear, a second body top and a second body bottom, the second body having a second body column extending from the second body bottom toward the second body top, the second body column having a body column outer surface, a generally round cross-section and a column end surface proximate the second body bottom and a second engagement mouth proximate the second body top, the second engagement mouth having a second wire engagement surface, a second mouth front edge and a second mouth rear edge, said second mouth front edge and second mouth rear edge extending away from a second mouth base, said second mouth rear edge proximate said second body rear and said second mouth front edge proximate said second body front, the second wire engagement surface extending between said second mouth front edge and second mouth rear edge;

one of the first or second body comprising an engagement hook;

one of the first or second body comprising a plurality of ribs, the ribs comprising a rib bearing surface, the rib bearing surface proximate one of the internal cavity surface or the body column outer surface;

said first body engagement mouth facing away from said second body engagement mouth; a spring assembly located between the first body and the second body, said spring assembly having opposed first and second spring ends, the first spring end engaging the first body proximate the cavity floor, the second spring end engaging the second body proximate the second body bottom, the second body column located within the first body cavity, the support assembly having a non-compressed configuration wherein the first body is biased away from the second body by the spring assembly and the support assembly having a compressed configuration wherein a compression force compresses the spring assembly and the first body is biased toward the second body.

2. The assembly of claim 1 wherein the body cavity has a generally oval-shaped cross-section and the body column has a generally oval-shaped cross-section.

3. The assembly of claim 2 wherein the rib bearing surface is flat.

4. The assembly of claim 3 wherein the plurality of ribs have rectangular cross sections.

5. The assembly of claim 4 wherein the plurality of ribs comprises six ribs.

6. The assembly of claim 5 wherein each rib is equidistant from an adjacent rib.

7. The assembly of claim 6 wherein said body cavity oval-shaped cross-section and body column oval-shaped cross-section each have a major axis.

8. The assembly of claim 7 wherein the rib bearing surface is within 1 millimeter of one of the internal cavity surface or the body column outer surface.

9. The assembly of claim 8 wherein the rib bearing surface engages one of the internal cavity surface or the body column outer surface.

10. A support assembly for a wire shelf, the support assembly comprising:
    a first body having a first body front, a first body rear, a first body top and a first body bottom, a first engagement mouth comprising a first wire engagement surface and a first body collar, the first body collar comprising a first body collar wall, the first body collar wall defining a first body cavity having a cavity opening;
    a second body having a second body front, a second body rear, a second body top and a second body bottom, a second engagement mouth comprising a second wire engagement surface and a second body column extending from the second body bottom toward the second body top, the second body column having a body column outer surface;
    said second body column located in said first body cavity;
    one of the first body or second body comprising an engagement hook;
    one of the first body or second body comprising a plurality of ribs, the ribs comprising a rib bearing surface, the rib bearing surface proximate one of the internal cavity surface or the body column outer surface;
    and
    biasing means forcing the first body away from the second body wherein the support assembly has a non-compressed configuration wherein the first body is away from the second body and a compressed configuration wherein the first body is toward the second body.

11. The assembly of claim 10 wherein the first body collar wall has a uniform thickness.

12. The assembly of claim 11 wherein the body cavity and the body column each have generally oval-shaped cross-sections.

13. The assembly of claim 12 wherein the body cavity oval-shaped cross-section and the body column oval-shaped cross-section each have a major axis.

14. The assembly of claim 13 wherein said biasing means comprise a spring assembly located between the first body and second body.

15. The assembly of claim 13 wherein the rib bearing surface is flat.

16. The assembly of claim 15 wherein the plurality of ribs have rectangular cross sections.

17. The assembly of claim 16 wherein the plurality of ribs comprises six ribs.

18. The assembly of claim 17 wherein each rib is equidistant from an adjacent rib.

19. The assembly of claim 18 wherein the rib bearing surface is within 1 millimeter of one of the internal cavity surface or the body column outer surface.

20. The assembly of claim 18 wherein the rib bearing surface engages one of the internal cavity surface or the body column outer surface.

\* \* \* \* \*